Feb. 28, 1967     G. W. STANTON ET AL     3,306,952
GRAFT COPOLYMER OF AN ALKENYL AROMATIC POLYGLYCOL
ETHER ON A POLYMERIC CARBONAMIDE SUBSTRATE
Filed June 22, 1962
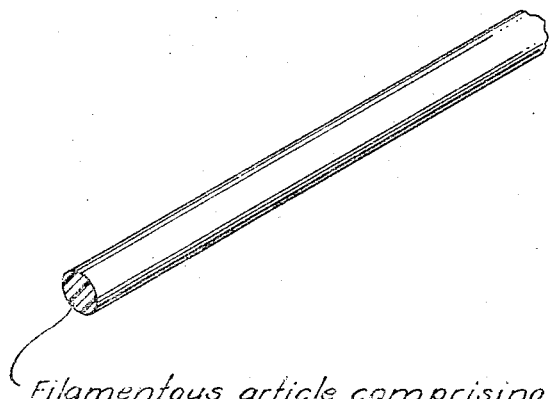
Filamentous article comprising a graft copolymer of certain olefinic monomers on a super-polyamide polymer substrate.
INVENTORS.
George W. Stanton
BY Teddy G. Traylor
Griswold & Burdick
ATTORNEYS 3,306,952
GRAFT COPOLYMER OF AN ALKENYL AROMATIC POLYGLYCOL ETHER ON A POLYMERIC CARBONAMIDE SUBSTRATE
George W. Stanton, Walnut Creek, and Teddy G. Traylor, Del Mar, Calif., assignors to The Dow Chemical Company, Midland, Mich., a corporation of Delaware
Filed June 22, 1962, Ser. No. 206,129
3 Claims. (Cl. 260—857)

This application is a continuation-in-part of copending application for United States Letters Patent having Serial No. 711,937, filed January 29, 1958, now abandoned.

The present invention lies generally in the field of organic chemistry and contributes in particular to the art which pertains to synthetic, fiber-forming high polymers. More particularly, the present invention has reference to the provision of hydrophilic or ionic graft or block-type copolymers exhibiting improved dyeability and reduced static charge that are comprised of certain types or varieties of monomers, as hereinafter more fully described, polymerized on superpolyamide polymer substrates.

Hydrophobic polymeric materials of varying origin are commonly employed in the manufacture of various synthetic shaped articles including films, ribbons, fibers, filaments, yarns, threads and the like and related structures, which hereinafter will be illustrated with particular reference to fibers. Superpolyamide polymers may be utilized with great advantage for such purposes.

The fiber-forming linear superpolyamide or carbonamide polymers that are contemplated as being adapted for employment as polymer substrates in the practice of the present invention include any of the thermoplastic resinous products that are obtained from the condensation between dicarboxylic acids and diamines or their equivalents, as well as those that may be prepared from such monomeric derivatives as the cyclic lactams or linear amino carboxylic acids, particularly those that are generically characterized as being "nylons," by which term such superpolyamide polymers will hereinafter be referred to. Advantageously, the nylon substrate that is utilized may be the fiber-forming resinous condensation product of hexamethylenediamine and adipic acid, such as the commercially available material of this type which is frequently referred to as being "nylon 6–6"; or the also commercially available, fiber-forming condensation products of epsilon caprolactam, such as the superpolyamide product of this type that is variously referred to as "nylon 6" or "Perlon."

Limitations are often encountered, however, in suitably dyeing synthetic hydrophobic fibers and the like that have been prepared from such superpolyamide (or, more simply, polyamide) polymers. This is especially the case when it is attempted to obtain relatively deeper shades of coloration in the finally dyed product, and is particularly true when certain varieties of dyestuffs, such as basic dyes, are involved.

Various techniques have been evolved for providing superpolyamide polymer compositions of improved dyeability and reduced static charge. The practice of such techniques has not always been completely satisfactory. Neither have the products thereby achieved always provided a completely suitable solution to the problems involved. For example, many of the fiber products which are prepared in accordance with the above-identified techniques known to the art often have inferior properties and characteristics when they are compared with those prepared from unmodified superpolyamide polymers. Furthermore, such products, once they have been prepared, may not be as receptive as might be desired to a wide range of dyestuff, due to inherent limitations in the materials capable of being employed for enhancing dye-receptivity.

It would be advantageous, and it is the chief aim and concern of the present invention, to provide superpolyamide or carbonamide polymers which have been modified with certain graft or block copolymerized substituents so as to be exceptionally dye-receptive, especially of basic type dyestuffs, while being capable of being fabricated into fibers and the like and related shaped articles having excellent physical properties and other desirable characteristics commensurate with those obtained with the unmodified superpolyamide polymer substrates, and of the general order obtainable, for example, with "nylon 6–6" or "nylon 6." This would possibilitate the manufacture of superpolyamide polymer based fibers and the like articles having the highly desirable combination of attractive physical characteristics and substantial capacity for and acceptance of dyestuffs. In addition, a decreased tendency to generate static electrical charges would be provided by the hydrophilic or ionic nature of the copolymer.

To the attainment of these and related ends, a dye-receptive superpolyamide polymer composition that is adapted to provide shaped articles having excellent physical properties and characteristics while being simultaneously receptive of and dyeable to deep and level shades of coloration with basic dyes as well as many others of a wide variety of dyestuffs is, according to the present invention, comprised of a fiber-forming graft or block copolymer which is comprised or consists essentially of a superpolyamide polymer substrate having a minor proportion of substituents graft copolymerized thereto consisting essentially of polymerized units that have been derived from certain monomers hereinafter identified.

Schematically, the compositions may be structurally represented in the following manner:

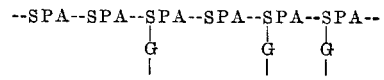

wherein the interlinked "SPA" symbols represent the superpolyamide polymer substrate or trunk and the symbols "G" connected thereto the substituent graft copolymer branches of a utilizable monomer provided thereon.

As is apparent, the graft copolymer substituent that is combined with the superpolyamide polymer substrate lends the desired receptivity of and substantivity for various dyestuffs to the compositions while the superpolyamide polymer trunk substrate that is so modified facilitates and secures the excellent physical properties and characteristics of the various shaped articles, including fibers, which may be made from the compositions. Advantageously, as mentioned, the superpolyamide polymer substrate that is modified by graft copolymerization to provide the compositions of the invention is "nylon 6–6," although "nylon 6" and other commercially available nylon substrates may also be utilized with great advantage.

It is usually beneficial, as has been indicated, for the graft copolymer compositions of the present invention to contain a major proportion of the superpolyamide polymer trunk or substrate that has been modified with the substituent, dye-receptive, graft copolymer groups chemically attached thereto. As a general rule, for example, it is desirable for the graft copolymer to be comprised of at least about 80 percent by weight of the superpolyamide polymer substrate. In many instances, it may be satisfactory for the graft copolymer composition to be comprised of between about 85 and 95 percent by weight of the superpolyamide polymer substrate, particularly when it is "nylon 6–6" or "nylon 6." In this connection, however, better dyeability may generally be achieved when the grafted copolymeric substituents are prepared under such conditions that they have relatively long chain lengths. Thus, it is usually preferable, when identical quantities of grafted substituents are involved for relatively fewer, but longer chain length grafts to be available than to have a greater number of substituents of relatively shorter chain length.

The several varieties of monomers which may be utilized to modify the superpolyamide polymer substrates so as to provide the graft copolymer compositions of the present invention may be any of those selected from the group consisting of vinyl lactam monomers (I); sulfonated acrylate and methacrylate monomers of the structural formula:

$$CH_2=CR-CO-Q-Y-(SO_3A)_n \qquad (II)$$

wherein R is selected from the group consisting of hydrogen and methyl, Q is selected from the group consisting of divalent sulfur, oxygen, and amide nitrogen, Y is selected from the group consisting of divalent and trivalent hydrocarbon radicals containing 1–4 carbon atoms, A is selected from the group consisting of hydrogen, alkali metals, and alkyl radicals containing 1–5 carbon atoms, and $n$ is an integer from 1–2; vinyl pyridine monomers of the structural formula:

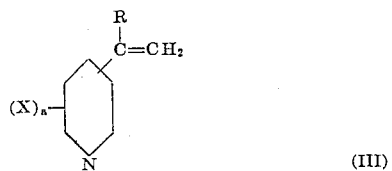

(III)

wherein X is individually selected from the group consisting of hydrogen, chlorine, bromine and alkyl radicals containing from 1–8 carbon atoms, and $a$ is an integer from 1–4 and R is as defined above for monomer (II); aminated alkenyl aromatic monomers of the structural formula:

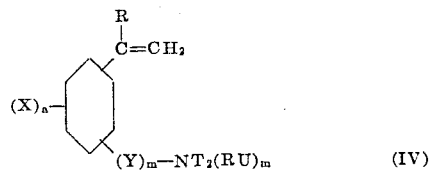

(IV)

wherein T is independently selected from the group consisting of hydrogen, alkyl radicals from 1–4 carbon atoms and hydroxyethyl radicals, U is a common anion, $m$ has a numerical value in whole units of 0–1 and R, X, Y, and $a$ are as defined above for monomers (II) and (III); aminated acrylate and methacrylate monomers of the structural formula:

$$CH_2=CR-CO-Q-Y-NT_2(RU)_m \qquad (V)$$

wherein R, Q, Y, T, U and $m$ are as defined above for monomers (II), (III) and (IV); and monomeric polyglycol ethers of alkenyl aromatics of the structural formula:

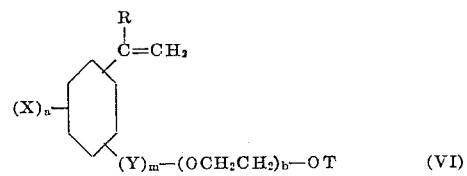

(VI)

wherein $b$ has an average numerical value between about 1 and 40, and R, X, Y, T, $a$ and $m$ are as defined above for monomers (II), (III), (IV).

In all of the above structural formulae the symbols C, H, O, N, etc. have their conventional and customary chemical nomenclature.

The vinyl lactam monomers which are utilized to modify the superpolyamide polymer substrates so as to provide the graft copolymer compositions of the present invention may be any of those (or their mixtures) which are variously characterized and generically known to the art as N-vinyl or 1-vinyl lactams. Such monomers as have been described and are involved in U.S. Patents No. 2,265,450; 2,317,804; and 2,335,454 may be suitably employed in the practice of the invention.

Standard procedures customarily employed in the synthesis of organic compounds are followed to obtain the various desired configurations of the present alkenyl benzyl polyglycol ethers. These alkenyl benzyl polyglycol ethers and their preparation are discussed in the copending application of Stephen C. Stowe for United States Letters Patent having Serial No. 205,090, now U.S. Patent No. 3,190,925, filed June 25, 1962, entitled "Monomeric Alkenyl Benzyl Polyglycol Ethers," which application is a continuation-in-part of application Serial No. 832,443, filed August 10, 1959, now abandoned. Two general methods are especially useful in obtaining a wide variety of required monomeric materials:

(1) 4-vinylbenzyl alcohol or its homologues such as isopropenyl benzyl alcohol, vinyl phenyl ethyl alcohol, vinyl phenol (hydroxy styrene), isopropenyl phenol, etc. can be readily reacted with ethylene oxide to produce the corresponding polyglycol ether. The chain length of the polyethylene glycol ether moiety is controlled as desired by the concentration of ethylene oxide and the temperature of reaction.

(2) Vinyl benzyl chloride or its homologues react with suitably selected polyglycols or polyglycol derivatives (such as monomethyl ethers) to provide a variety of monomers of the above indicated scope. The essence of the conditions for these reactions is widely described in the literature as for example, at page 1167 of "Organic Chlorine Compounds" by E. H. Huntress (Wiley & Sons, 1948).

Typical of the various monomers that may be employed with benefit in the practice of the present invention are those included in the following tabulations, grouped according to general type, wherein the species that are deemed to be of especial advantage for use are designated by the symbol (F):

TABLE 1.—TYPICAL VINYL LACTAMS OF GENERIC TYPE (I)

N-vinyl-pyrolidone (F)
5-methyl-N-vinyl-pyrrolidone
3,3-dimethyl-N-vinyl-pyrrolidone
N-vinyl-piperidone
3,3-dimethyl-N-vinyl-piperidone
N-vinyl-caprolactam (F)
N-vinyl-hexahydrophthalimidine
N-vinyl-5-methyl oxazolidinone (F)

TABLE 2a.—TYPICAL SULFOALKYLACRYLATES OF FORMULA II 2-sulfoethylacrylate (F)
2-sulfoethylmethacrylate, sodium salt
2-sulfoethylmethacrylate, methyl ester
2-sulfoethylmethacrylate, potassium salt
3-sulfopropylacrylate, sodium salt (F)
1,3-disulfo 2-propanol ester of methacrylic acid (F)

TABLE 2b.—TYPICAL ACRYLOYL TAURINES OF FORMULA II

N-acryloyl taurine (F)
N-acryloyl taurine, sodium salt
N-methacryloyl taurine, methyl ester
N-methacryloyl taurine, potassium salt
N-acryloyl taurine, ethyl ester (F)
N-acryloyl-aminopropane sulfonic acid
N-methacryloyl-aminopropane sulfonic acid, sodium salt

TABLE 3.—TYPICAL VINYL PYRIDINES OF FORMULA III 2-vinyl pyridine (F)
2-vinyl-4-methyl pyridine (F)
4-vinyl pyridine (F)
2,4-diethyl-6-vinyl pyridine
2-methyl-4-vinyl pyridine
2-vinyl-4-tertiary-butyl pyridine
2-chloro-4-vinyl pyridine

TABLE 4.—TYPICAL ALKENYL AROMATIC AMMONIUM COMPOUNDS OF FORMULA IV 4-vinyl benzyl amine
4-vinyl benzyl-N-methyl-amine, sulfate
4-vinyl benzyl-N,N-dihydroxyethyl N-methyl ammonium chloride (F)
2-methyl-4-vinyl-benzyl-N-methyl-N-hydroxy-ethylamine
2-tertiary-butyl-4-vinyl-benzyl-N,N-dimethylamine
4-vinyl benzyl trimethyl ammonium chloride (F)
N,N-dimethyl-4-vinyl aniline, hydrochloride

TABLE 5.—TYPICAL AMINOETHYL ACRYLATES OF FORMULA V 2-aminoethylacrylate
2-aminoethylmethacrylate
N-methyl-2-aminoethylacrylate
N-methyl-2-aminoethylmethacrylate
N,N-dimethyl-2-aminoethylacrylate (F)
N,N-dimethyl-2-aminoethylmethacrylate (F)
N-ethyl-2-aminoethylacrylate, hydrochloride
N-ethyl-2-aminoethylmethacrylate
N,N-diethyl-2-aminoethylacrylate
N,N-diethyl-2-aminoethylmethacrylate
N-methyl N-ethyl-2-aminoethylacrylate
N-methyl N-ethyl-2-aminoethylmethacrylate

TABLE 6.—TYPICAL POLYGLYCOL ETHERS OF ALKENYL AROMATICS OF FORMULA VI 1-(4-vinyl benzyloxy)-2-methoxyethoxy ethane
2-(4-vinyl benzyloxy)-(ethoxy)$_{18}$ ethyl alcohol (F)
2-(4-vinyl benzyloxy)-(ethoxy)$_{18}$ ethyl chloride
2-(4-vinyl phenoxy)-(ethoxy)$_{10}$ ethyl, methyl ether (F)
2-(4-isopropenyl benzyloxy)-(ethoxy)$_{10}$ ethyl alcohol
2-(2-vinyl benzyloxy)-(ethoxy)$_4$ ethyl, ethyl ether
2-(4-vinyl phenoxy)-(ethoxy)$_{16}$ ethyl alcohol
2-(4-isopropenyl phenyl) 2-(2-hydroxy)-(ethoxy)$_{16}$ propane
2-(4-vinyl benzyloxy)-(ethoxy)$_{10}$ ethyl alcohol (F)

If desired, the various diverse types of monomers which are adapted to be employed in the practice of the present invention may be utilized in certain combinations or mixtures with one another in order to prepare mixed graft copolymers having specific properties and effects, particularly with respect to their capability for accepting greater numbers of different types of dyestuffs. For example, the sulfonated monomers ordinarily provide graft copolymers showing excellent acceptance of basic dyestuffs. On the other hand, the nitrogen containing monomers, i.e., the vinyl pyridine and the aminated monomers, usually provide graft copolymers that exhibit good acceptance of direct and acid type dyestuffs. Thus, mixtures of such diverse types of monomers may frequently be utilized in beneficial combination with one another in order to enhance the general dye-receptivity of the resulting product.

As mentioned, the graft copolymer compositions of the invention have remarkably good dye-receptivity, especially of basic dyestuffs, particularly in view of their superpolyamide polymer origin. In most cases, for example, the dye-receptivity of the graft copolymer compositions of the present invention is improved to such an extent in comparison with unmodified superpolyamide polymers, particularly unmodified "nylon 6–6," that a color differential of at least about 30 Judd units, as hereinafter illustrated, may readily be obtained between samples of the unmodified superpolyamide polymer substrate and the graft copolymer compositions of the present invention, each of which have been dyed under identical conditions according to conventional techniques with any of the basic dyestuffs. A noticeable and significant improvement in dye-receptivity of the superpolyamide substrate may even be achieved by practice of the present invention as regards its acceptance of the direct and acid types of dyestuff, despite the fact that such dyes are normally considered to be suitable for the coloration of nylon polymers. This is a significant advantage when the compositions are fabricated into shaped article form, especially when they are prepared in a filamentary form suitable for use as a textile material.

The Judd unit referred to in the foregoing is described and defined by D. B. Judd in an article in the "American Journal of Psychology," vol. 53, page 418 (1939). More applicable data appear in "Summary on Available Information on Small Color Difference Formulas" by Dorothy Nickerson in the American Dyestuff Reporter, vol. 33, page 252 (June 5, 1944). See also "Interrelation of Color Specifications" by Nickerson in the "Paper Trade Journal," vol. 125, page 153 for November 6, 1947.

As is well known, Calcodur Pink 2BL is a direct type of dye that has a Colour Index 353, more recently designated Colour Index Direct Red 75. It is commercially obtainable under the indicated trade-designation. The same dyestuff, which is the sodium salt of 3,3'-disulphodiphenyl-urea - 4,4' - diazobis-2-amino-8-naphthol-6-sulfonic acid, is actually available (frequently under several commercial designations) from other sources. Calcodur Pink 2BL has the following structural formula, as is given on page 88, Section A, Part IV of the "Colour Index" (1st ed., 1924) published by the (British) Society of Dyers and Colourists:

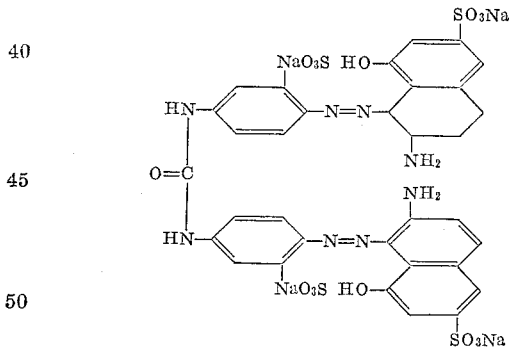

Besides having excellent physical properties and other desirable characteristics, fibers and the like articles comprised of the present compositions similarly have the indicated high capacity for being readily and satisfactorily dyed to deep and level shades of coloration with many dyestuffs in addition to basic dyes. For example, fibers of the present compositions may be easily and successfully dyed according to conventional procedures using acid, vat, acetate, direct, naphthol, and sulfur dyes. Such dyestuffs, by way of didactic illustration as Calcocid Alizarine Violet (Colour Index 61,710, formerly Colour Index 1080), Sulfanthrene Red 3B (Colour Index Vat Violet 2), Amacel Scarlet BS (American Prototype Number 244 and Colour Index Dispersed Red 1 or 11,110), Naphthol ASMX (Colour Index 35,527), Fast Red TRN Salt (Colour Index Azoic Diazo Component 11), and Immedial Bordeaux G (Colour Index Sulfur Brown 12) may advantageously be employed for such purposes.

Other dyestuffs, by way of further illustration that may be utilized beneficially on the fiber products of the dye-receptive graft copolymer compositions of the invention include such direct cotton dyes as Chlorantine Fast Green 5BLL (Colour Index Direct Green 27), Chlorantine Fast Red 7B (Colour Index Direct Red 81), Pontamine Green GX Conc. 125 percent (Colour Index Direct Green 6), Calcomine Black EXN Conc. (Colour Index Direct Black 38), Niagara Blue NR (Colour Index Direct Blue 151) and Erie Fast Scarlet 4BA (Colour Index Direct Red 24); such acid dyes as Anthraquinone Green GN (Colour Index Acid Green 25), Sulfonine Brown 2R (Colour Index Acid Orange 51), Sulfonine Yellow 2G (Colour Index Acid Yellow 40), Xylene Milling Black 2B (Colour Index Acid Black 26A), Xylene Milling Blue FF (Colour Index Acid Blue 61), Xylene Fast Rubine 3GP PAT (Colour Index Acid Red 57), Calcocid Navy Blue R Conc. (Colour Index Acid Blue 120), Calcocid Fast Blue BL (Colour Index Acid Fast Blue 59), Calcocid Milling Red 3R (Colour Index Acid Blue 51), Amacid Azo and Yellow G Extra (Colour Index Acid Yellow 63); such mordant-acid dyes as Alizarine Light Green GS (Colour Index Acid Green 25); such basic dyes as Brilliant Green Crystals (Colour Index Basic Green 1) and Rhodamine B Extra S (Colour Index Vat Blue 35); such vat dyestuffs as Midland Vat Blue R Powder (Colour Index Vat Blue 35), Sulfanthrene Brown G Paste (Colour Index Vat Brown 5), Sulfanthrene Blue 2B Dbl. Paste (Colour Index Vat Blue 5), and Sulfanthrene Red 3B Paste (Colour Index Vat Violet 2); Indigosol Green IB Powder (Colour Index Vat Green 1), a soluble vat dyestuff; such acetate dyes as Celliton Fast Brown 3RA Extra CF (Colour Index Dispersed Orange 5), Celliton Fast Rubine BA CF (Colour Index Dispersed Red 13), Artisil Direct Red 3BP and Celanthrene Red 3BR Conc. (both Colour Index Dispersed Red 15), Celanthrene Pure Blue BRS 400 percent (Colour Index Dispersed Blue 1) and Acetamine Yellow N (Colour Index Dispersed Yellow 32); B-Naphthol←-2-chloro-4-nitroaniline, an azoic dye; such sulfur dyes as Katigen Brilliant Blue GGS High Conc. (Colour Index Sulf. Blue 9) and Indo Carbon CLFS (Colour Index Sulf. Blue 6); and premetallized dyestuffs including Cibalan Yellow GRL (Colour Index Acid Yellow 116); and the like.

The dyed products, especially textile fiber products, are generally lightfast and are well imbued with good resistance to crocking. A shaped filamentary article prepared from a dye-receptive composition in accordance with the present invention is schematically illustrated in the sole figure of the hereto annexed drawing.

The dye-receptive graft copolymers of the present invention may be prepared and provided by swelling or impregnating the superpolyamide polymer substrate with the monomeric substance then polymerizing the monomer in situ in the polymer substrate. Advantageously, this may be accomplished when the substrate is in the form of an already shaped article, such as a fiber or filamentary structure. Beneficially the graft copolymerization of the impregnated monomer may be accomplished and facilitated with the assistance of a polymerization catalyst or catalyzing influence which, preferentially, interacts with the substrate in order to establish or form grafting sites thereon and simultaneously or subsequently initiate the graft copolymerization. As a practical matter, it is generally most desirable to form the graft copolymer compositions in such a manner. Most of the free radical generating chemical catalysts, including peroxide and persulfate catalysts, may be utilized for the desired graft copolymerization. It may often be exceptionally advantageous, however, to accomplish the graft copolymerization by subjecting the monomer-impregnated superpolyamide polymer substrate to a field of high energy radiation in order to efficiently provide an effectively attached graft copolymer of the polymerized monomeric impregnate on the hydrophobic superpolyamide polymer substrate.

The monomer may be intimately impregnated in the superpolyamide polymer substrate in any desired manner prior to the graft copolymerization. Thus, the monomer may be directly applied, particularly when it has a swelling effect on the substrate, or it may be applied from dispersion or solution in suitable liquid vehicles, preferably those tending to swell the polymer, until a desired monomer content has been obtained. Ordinarily, it is advantageous for the monomer to be diluted in a solvent or dispersant vehicle so as to provide a treating bath in which to swell or impregnate the superpolyamide polymer substrate with the latter being immersed in the bath for a sufficient period of time to attain a desired monomer content adequate for the intended purpose. The superpolyamide polymer substrate, as has been mentioned, may be in any fabricated or unfabricated form. Unfabricated graft copolymer compositions in accordance with the present invention may be converted to shaped articles by any desired technique adapted for such purpose with conventional polymers. It is generally desirable and of significant advantage, however, to impregnate a preformed article, such as a textile fiber of the superpolyamide polymer (or a cloth or fabric comprised thereof) with the monomer in order to prepare the graft copolymer compositions of the invention.

In this connection, particularly when preformed fiber structures are involved, the article may be in any desired state of formation for the impregnating and graft copolymerizing modification. Thus, fibers and films may be treated before or after any stretch has been imparted thereto. In addition, they may be in various stages of orientation, or in a gel, swollen or dried condition.

The impregnation and succeeding polymerization may, in general, be effected at temperatures between about 0° C. and about 200° C. for periods of time ranging up to 4 or more hours. The most suitable conditions in each instance may vary according to the nature and quantity of the specific monomeric impregnant involved and the graft copolymerizing technique that is utilized. For example, when chemical catalysts are employed for purposes of forming the graft copolymer, a temperature of between about 50° and 100° C. for a period of time between about 15 and 45 minutes may frequently be advantageously employed for the purpose. Under the influence of high energy radiation, however, it may frequently be of greatest advantage to accomplish the graft copolymerization at temperatures between about 20 and 60° C. utilizing relatively low dose rates and total dosages of the high energy for the desired purpose. Graft copolymerization on pre-activated substrates may ordinarily be accomplished by simply exposing the activated substrate to the monomer (preferably in concentrated solution) at an elevated temperature until the graft copolymerized substituents have formed on the substrate.

When the graft copolymer compositions are prepared from preformed or already shaped superpolyamide polymer substrates that are successively impregnated with the monomer, which is then graft copolymerized in situ in the shaped article, excess monomer, if desired, may be squeezed out or removed in any suitable manner prior to effecting the graft copolymerization.

The chemical free radical generating catalysts which may be employed with greatest advantage in the preparation of the graft copolymer compositions of the present invention include hydrogen peroxide, benzoyl peroxide, cumene hydroperoxide, ammonium or potassium persulfate and the like. Such catalysts may be used in conventional quantities to effect the graft copolymerization. When they are utilized, it is of greatest benefit to incorporate them in the impregnating solution of the monomer that is used.

Actinic light may be advantageously used in some cases to initiate polymerization or to pre-activate sites on the polyamide substrate. Light having wave lengths in the ultraviolet region is usually preferred.

The high energy radiation which may be employed for inducing the graft copolymerization for the preparation of the graft copolymers of the present invention is of the type which provides emitted particles or photons having an intrinsic energy of a magnitude which is greater than the planetary electron binding energies that occur in the graft copolymerizing materials. Such high energy radiation is available from various radioactive substances which provide beta or gamma radiation as, for example, radioactive elements including cobalt-60 and cesium-137, nuclear reactor fission products and the like. If it is preferred, however, high energy radiation from such sources as electron beam generators, including linear accelerators and resonant transformers, X-ray generators and the like may also be utilized. It is beneficial to employ the high energy radiation in a field of at least about 40,000 roentgens per hour intensity. A roentgen, as is commonly understood, is the amount of high energy radiation as may be provided in a radiation field which produces in one cubic centimeter of air at 0° C. and 760 millimeters of absolute mercury pressure, such a degree of conductivity that one electrostatic unit of charge is measured at saturation (when the secondary electrons are fully utilized and the wall effect of the chamber is avoided). It is most desirable, incidentally, to graft copolymerize all or substantially all of the monomeric impregnant to and with the superpolyamide polymer substrate being modified in order to provide the compositions of the present invention. In addition, as has been indicated, particularly when pre-activation of the substrate is performed, ultraviolet light may also be employed as the high energy radiation form. Preactivation or graft site formation with oxygen and ultraviolet light or ozone may also be satisfactory in many instances.

For purposes of specifically illustrating, without intending to thereby limit the invention, the following didactic examples are provided wherein, unless otherwise indicated, all parts and percentages are to be taken by weight.

*Example 1*

About 0.5 gram on a dry weight basis of "nylon 6–6" staple fiber, after having been scoured, was placed in about 5 milliliters of dimethylaminoethyl methacrylate in order to impregnate the monomer into the polymer substrate. After the impregnation, the monomer-containing fiber sample was flushed with nitrogen and then irradiated by exposure at room temperature to a high energy, X-ray radiation beam from a Van de Graaff electrostatic generator operating under a potential of 2 million electron volts with a 250 microampere beam current impinging on a tungsten target. The monomer impregnated fiber was subjected to the high energy at a dosage rate of about 60 mrep. (million roentgent equivalent physicals) per minute until a total dose of about 10 mrep. had been obtained. The irradiated yarn was then washed thoroughly with water, dried, scoured and then dyed in the conventional manner with Calcodur Pink 2BL. Excellent results were experienced. A tremendous improvement in the dyeability of the graft copolymer product was noted as compared to that of the plain nylon.

*Example 2*

The procedure of Example 1 was repeated excepting that the fiber was impregnated with monomeric 1-(2-methoxyethoxy)2-vinylbenzyloxy-ethane. After the irradiation, the graft copolymerized fiber product was found to be dyeable to deep and level shades of coloration with Amacel Scarlet BS. In contrast, the unmodified fiber could be dyed only to a much less pronounced degree with the same dystuff. In addition, when tested for static electricity generation by rubbing on a piece of nylon cloth, the treated sample was found to develop a much lower charge than the untreated sample.

Results similar to the foregoing may also be obtained when any other of the mentioned varieties of monomers of the types of Formulae I through VI are utilized in a similar manner in place of those set forth in the above examples and when graft copolymers are prepared with such monomers on unfabricated forms of the superpolyamide polymer substrate or when the graft copolymerization is accomplished with other varieties of superpolyamide polymers besides those used for purposes of didactic illustration.

What is claimed is:

1. Dye-receptive graft copolymer composition comprised of (1) a superpolymer substrate which is a fiber-forming, linear polymeric carbonamide that contains recurring carbonamide groups as an integral part of the main polymer chain separated by at least two carbon atoms having chemically attached thereto to carbon atoms in its chain, as graft copolymerized substituents thereon, a minor proportion of up to about 20 weight percent, based on the weight of the composition, of units consisting of (2) a polymerized polyglycol ether of an alkenyl aromatic of the structural formula:

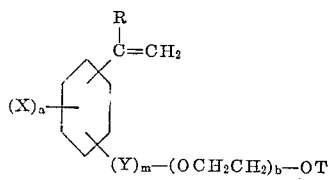

wherein $b$ has an average numerical value between about 1 and 40, R is selected from the group consisting of hydrogen and methyl, X is individually selected from the group consisting of hydrogen, chlorine, bromine and alkyl radicals containing from 1 to 8 carbon atoms, Y is selected from the group consisting of bivalent and trivalent hydrocarbon radicals containing 1 to 4 carbon atoms, T is individually selected from the group consisting of hydrogen, alkyl radicals containing from 1 to 4 carbon atoms and hydroxyethyl radicals, $a$ is an integer from 1 to 4, and $m$ has a numerical value in whole units of 0 to 1.

2. A filamentary shaped article comprised of the composition set forth in claim 1.

3. The composition of claim 1, wherein said substituent graft copolymer units are comprised of a polymerized polyglycol ether of vinyl benzyl alcohol.

References Cited by the Examiner
UNITED STATES PATENTS 2,999,056  9/1961  Tanner _____ 260—857
3,088,791  5/1963  Cline et al. _____ 260—857

MURRAY TILLMAN, *Primary Examiner.*

JAMES A. SEIDLECK, *Examiner.*

N. W. SHUST, P. LIEBERMAN, *Assistant Examiners.*